March 18, 1924.

A. J. MOGLICH 1,487,259

TOOL HOLDER

Filed March 20, 1922

INVENTOR.
ANTHONY J. MOGLICH
BY M. C. Frank
ATTORNEY

Patented Mar. 18, 1924.

1,487,259

UNITED STATES PATENT OFFICE.

ANTHONY J. MOGLICH, OF OAKLAND, CALIFORNIA.

TOOL HOLDER.

Application filed March 20, 1922. Serial No. 545,055.

*To all whom it may concern:*

Be it known that I, ANTHONY J. MOGLICH, a citizen of the United States, and a resident of Oakland at 728 Peralta Street, county of Alameda, and State of California, have invented a new and useful Tool Holder, of which the following is a specification.

My invention relates more particularly to tool holders for various machine tools, such as lathes, planers, boring mills, or the like, designed more or less for general use in a machine shop. The tool holder is adapted primarly to be inserted and secured in the slot of the commonly used tool post carried by the machine.

Existing tool holders of this type, generally hold and support a small steel cutting tool thrust in the slot of the holder by means of a set screw. The cutting tool most frequently is self-hardening tool steel, and the set screw is also of steel and hardened, and is provided with a pointed cupped end. The hard set screw being tightened on the hard tool steel very frequently results in breaking or fracturing the latter. The broken pieces are then too short to be engaged by the tool holder, resulting in waste as the cutting steel is very expensive, and the attendant loss of time promotes inefficiency. This present set screw method of holding the tool steel cutter in position, eventually stresses the threads of the tool holder to such an extent that the stripping of its threads is common, and the duration of the tool holder is consequently short lived.

The chief objects of my invention are to overcome the above objectionable features and to utilize the steel to a minimum length, and in addition, permitting the quick insertion and removal of the cutting member. Another object is, that neither the tool holder nor the cutting member are marred in the least by the manner of holding the latter in the holder. I attain these objects by the general arrangement of the parts illustrated in the accompanying drawing, and described hereafter in detail, and the features wherein my invention resides are finally claimed at the conclusion of the specification.

Figure 1:
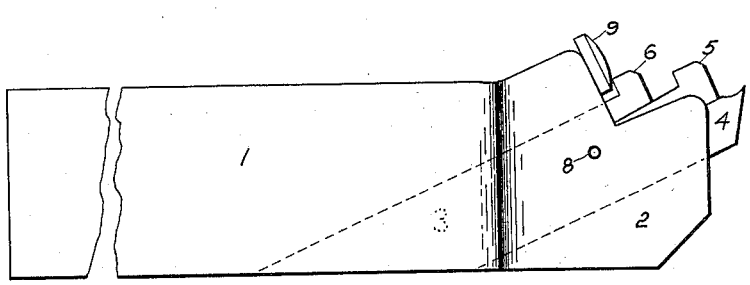
Figure 2:
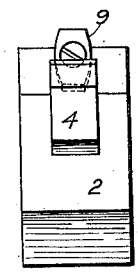
Figure 3:
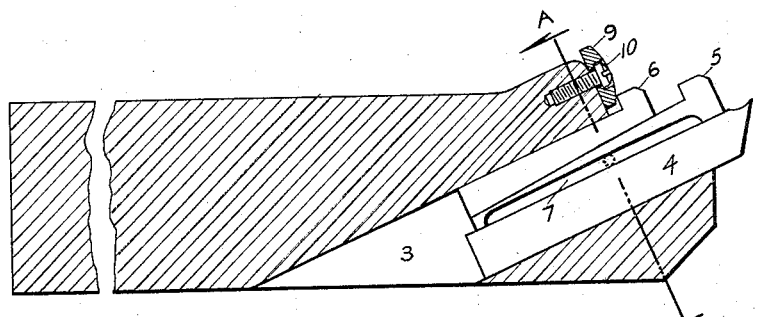
Figure 4:
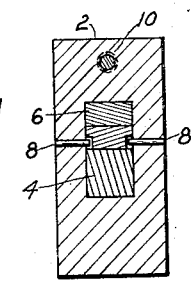

Figure 1 is a side elevation of the tool holder and Fig. 2 an elevation of the cutting end of it. Fig. 3 is a partial vertical central section of the device, and Fig. 4 a transverse cross-section along the line A—A of Fig. 3 looking in the direction of the arrows.

Throughout the different views 1 represents the bar of the tool holder and which may be of such length and shape as to be received within the slot of the tool post, and 2 the head of the holder, here shown upset, and provided with an angular cut-away portion for manipulating the holding elements of the device. 3 is preferably a rectangular slot through the holder, and 4 the cutting steel therein, shown clearly in Fig. 3 in position ready for use. 5 and 6 are two hardened steel wedges, 5 the tightening or driving wedge to hold the cutter 4 in the chosen position and 6 the releasing wedge. On each side of wedge 5 may be formed a shallow recess 7 for the reception of pins 8, the wedge slidably engaging the pins for the purpose of preventing the wedges from falling out of the slot 3 when the cutter 4 is removed from the holder. Both wedges may be provided with heads, the body of wedge 5 tapering from its head, and the body of wedge 6 tapering toward its head. It is evident from Fig. 3 that when wedge 6 is released it cannot slide downwardly and out because of its head, and wedge 5 cannot be pulled upwardly and out because of the pins 8 engaging the recesses 7.

9 is a key having a counterbored hole, and rotatably secured to the end of the holder just above wedge 6 by the screw 10. It is for the purpose of preventing wedge 6 from slipping downwards while wedge 5 is being tightened on the cutter 4.

In operation, wedge 6 and key 9 are positioned as shown in Fig. 3. Wedge 5 is slid upwardly a little by the fingers and cutter 4 inserted in the slot and positioned to suit, then the head of wedge 5 is tapped by a small hammer until the cutter is seated in holding relation. To release or remove the cutter, the projecting end of the key 9 is lightly tapped laterally, disengaging it from under the head of wedge 6; tapping the head of the latter wedge causes it to slide downwardly, thereby immediately releasing the other wedge and the cutter also.

Having described and illustrated the preferred embodiment of my invention, it is to be understood that I do not wish to be limited precisely to the device as shown and described, but wish to embrace all modifications of it that come within the spirit and scope of the appended claims.

I claim as my invention:—

1. A longitudinally and parallel slotted rectangular-bar tool holder for machines comprising a pair of wedges and a cutter, one of said wedges adapted to receive blows to hold the cutter in the slot and the other wedge adapted to receive blows to release the said cutter, the said wedges receiving the blows from the same direction.

2. A rectangular-bar tool holder for machines comprising a releasing wedge and a driving wedge, the latter provided with a recess on each side thereof to slidably engage pin means carried by the holder for preventing the wedges from dropping from the holder, and both of the said wedges adapted to be driven longitudinally and in the same direction for functioning.

3. In combination, a rectangular machine-tool holder having an oblique rectangular slot therein adapted to receive a rectangular tool, and a pair of wedges adapted to engage said tool over the greater portion of its length to wedge it securely in said slot, both of said wedges adapted to move longitudinally in the securement of said tool.

4. In combination, a rectangular machine-tool holder, having, an oblique rectangular slot therein adapted to receive a rectangular cutter-tool, a pair of wedges adapted to engage said tool over the greater portion of its length and wedge it securely in said slot, one of said wedges grooved longitudinally along its sides, and pins in said holder projecting into said grooved slots to retain said wedges when loosened, and both of said wedges adapted to move longitudinally in the securement of said cutter-tool.

5. A rectangular-bar tool holder for machines, comprising a bar having a hole therethrough of uniform cross-section, a pair of wedges and a cutter adapted to be received within said hole, the said wedges forming means for adjustably holding the cutter therein, the wedges and cutter adapted to move longitudinally in the hole to accomplish the said holding of the cutter.

6. In combination a rectangular machine-tool holder, having an oblique rectangular slot therein of uniform cross-section adapted to receive a rectangular tool, a pair of wedges in engagement with each other one having a plane face adapted to engage said tool over the greater part of its length and wedge it securely in said slot and the other of which is provided with a head projecting therefrom, and means carried by the holder adapted to engage said head to facilitate the tightening and loosening of the tool.

7. A machine-tool holder, comprising a rectangular bar, a pair of wedges and a cutter, the bar provided with a longitudinally inclined slot to engage the wedges and the cutter, one of said wedges adapted to be driven to hold the cutter in position, and the other wedge adapted to release the cutter from a holding position, said driven wedge adapted to engage means carried by the bar to prevent both wedges from dropping from the holder when the cutter is removed.

8. A machine-tool holder, comprising a rectangular bar having a longitudinally inclined hole therethrough for the reception of a binding wedge, a releasing wedge and a cutter, the releasing wedge provided with a projecting head, and the bar provided with means to engage said projecting head to prevent downward movement of said releasing wedge in the act of tightening said binding wedge.

9. A tool holder, comprising a bar having an inclined hole therethrough for the reception of a binding wedge, a releasing wedge and a cutter, the releasing wedge provided with a projecting head, and the bar provided with means to engage said projecting head to prevent downward movement of said releasing wedge in the act of tightening said binding wedge, and the latter wedge adapted to engage means carried by the bar to suspend both wedges to the bar, after the cutter has been released and removed.

ANTHONY J. MOGLICH.